Figure 1:
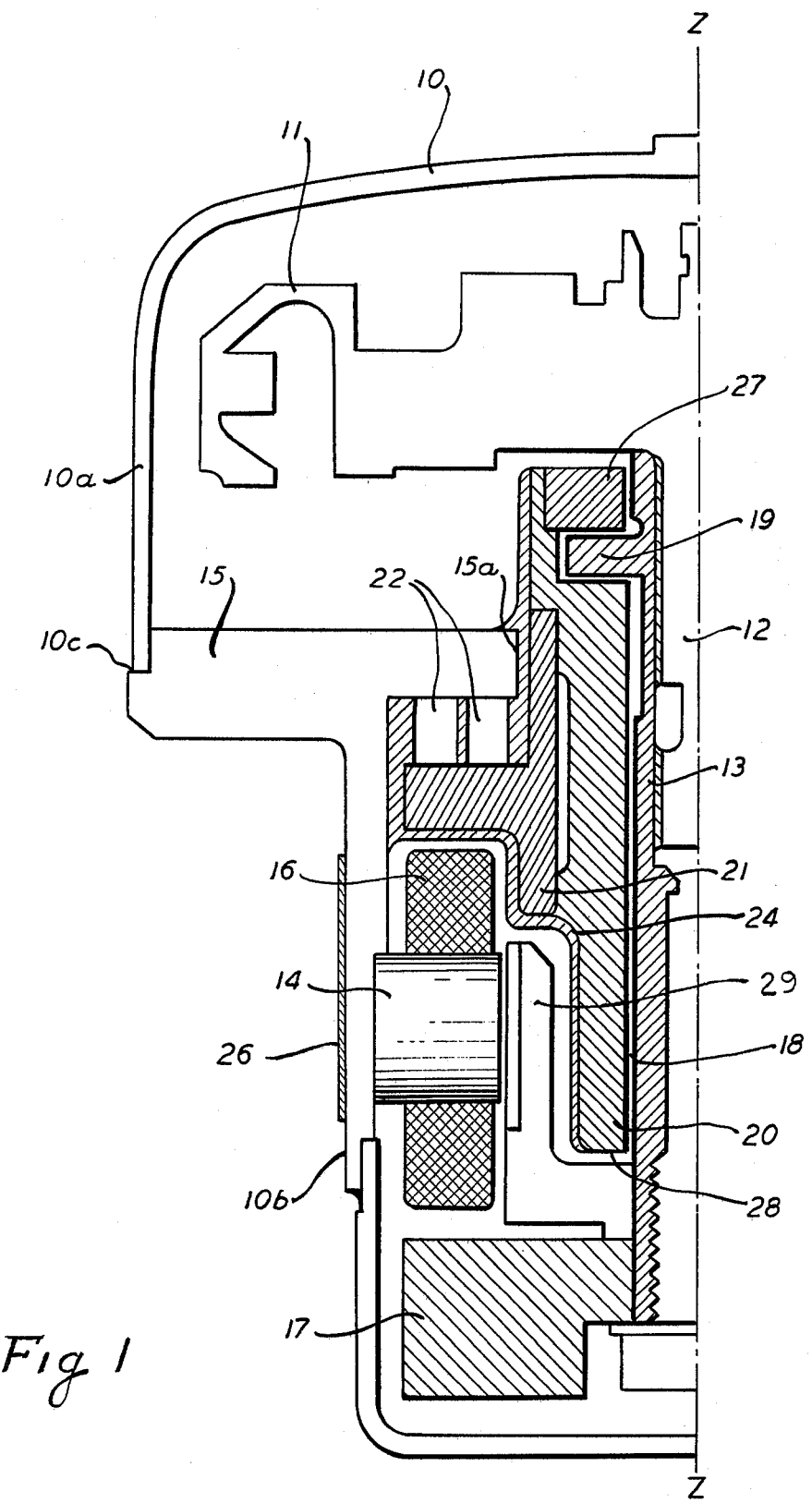

United States Patent [19]

Ljung

[11] 4,085,982
[45] Apr. 25, 1978

[54] SEAL FREE LIQUID BEARING

[75] Inventor: Bo Hans Gunnar Ljung, Wayne, N.J.

[73] Assignee: The Singer Company, Little Falls, N.J.

[21] Appl. No.: 726,895

[22] Filed: Sep. 27, 1976

[51] Int. Cl.² .............................................. F16C 37/00
[52] U.S. Cl. ...................................... 308/76; 74/5 R; 308/111; 308/171
[58] Field of Search ............. 308/76, 77, 111, DIG. 1, 308/171, 9, 240; 74/5 R, 5.7; 310/90; 165/73; 184/1 E;104 R, 277/DIG. 5

[56] References Cited
U.S. PATENT DOCUMENTS

| 3,336,092 | 8/1967 | Duchterman | 308/171 X |
| 3,662,609 | 5/1972 | Jacobson | 74/5 R |
| 3,778,123 | 12/1973 | Hendler et al. | 308/36.3 |
| 3,853,602 | 12/1974 | Nakamura | 308/9 X |

Primary Examiner—Trygve M. Blix
Assistant Examiner—Douglas C. Butler
Attorney, Agent, or Firm—Laurence A. Wright; Thomas W. Kennedy

[57] ABSTRACT

A liquid bearing having general utility but beneficial use in a gyroscope comprising Peltier elements which remove heat from a holder and from the thrust and journal bearing, and a low viscosity lubricant such as n-heptane or a fluorocarbon is introduced into the evacuated gyroscope casing to fill the voids therein. The low viscosity lubricant surrounds the journal and thrust bearings. When a source of current is applied to the Peltier element, heat is removed from the journal and thrust bearings and a condensate of the low viscosity lubricant is formed on the untreated bearing surfaces, thus cooling the bearing. This heat is conducted away from the bearing surfaces via the holder, the bearing sleeve, and the Peltier elements. Grooves are formed on the bearing shaft to urge flow of the low viscosity lubricant through and around the bearing surfaces by capillary action. An alternate manner for removal of heat from the bearing surfaces, in lieu of the Peltier elements, is provided in the use of a heat pump.

12 Claims, 2 Drawing Figures

SEAL FREE LIQUID BEARING

This invention is related to liquid or fluid bearings. More particularly, this invention is related to a fluid bearing usable in a gyroscope, which can be operated reliably with a low viscosity liquid without the use of seals.

BACKGROUND OF THE INVENTION

The ball bearing as a means of reducing friction between rotating or moving parts has enjoyed wide usage in a variety of different types of apparatus. However, in gyroscopic applications, the use of ball bearings constitutes an undesirable source of error torque, which results in unpermissible gyroscopic drift, noisy operation and a limited life (in the order of 5000 hours). In order to overcome the disadvantages of ball bearings, gas bearings have sometimes been used in gyroscopic applications. However, they have the principal disadvantage in that they cannot be used in flexure-suspended free gyroscopes because of imcompatibility in working pressure. Gas bearings of the hydrodynamic type require a gas pressure of the order of one atmosphere, whereas the gyroscope itself requires pressure lower than 1/5 atmosphere in order to achieve low damping.

In order to improve gyroscopic performance, liquid bearings of the type disclosed in U.S. Pat. No. 3,778,123, filed in the name of Harvey S. Hendler et al. and assigned to the same assignee as the present invention, have been proposed. That invention describes a liquid bearing with seals.

It is necessary in liquid bearings to utilize liquids with low viscosity, in the order of 0.5 to 1 centistoke, in order to obtain low damping. Unfortunately, such liquids also exhibit relatively high vapor-pressures. The liquid has to be confined in the bearing by means of seals to avoid loss of lubricant. The amount of liquid in the bearing gap is extremely small, in the order of 200 mg. The seals also have to accommodate a change in volume as the temperature of the bearing changes. Minute leakages, in the order of a few nanograms liquid/hour, will eventually shorten the length of life of the bearing.

BRIEF DESCRIPTION OF THE INVENTION

The present invention provides a liquid bearing usable in a gyroscope which can be operated without the means of seals. The liquid bearing of the present invention is contained in a hermetically sealed gyroscope housing wherein the bearing is functionally divided into two areas, a journal bearing, and a thrust bearing, which support a flexure-supported rotor by means of a bearing shaft. The outer sleeve of the bearing is attached to a holder by adhesive bonding. Peltier elements are attached to the holder so that the elements are connected in series. The gyroscope, at the time of manufacture, is evacuated and filled with a low viscosity lubricant such as n-heptane or fluorocarbon. An alternate method provided for removing heat is the use of a heat pump in lieu of the Peltier elements.

Accordingly, it is an object of this invention to provide a liquid bearing for a gyroscope which has no moving parts, thus providing a bearing system having a long life.

It is a further object of this invention to provide a gyroscope liquid bearing wherein evacuation and filling of the instrument is simplified.

It is yet a further object of this invention to provide a gyroscope liquid bearing wherein the temperature limits are quite wide such that the high temperature exposure during storage will not render the instrument inoperative.

It is still another object of this invention to provide a gyroscope liquid bearing wherein no heavy metals are required in the system, thus making the bearing system tolerant to radiation.

It is yet another object of this invention to provide a gyroscope bearing that is unaffected by seal wear or dynamic instability of the seal.

Figure 2:
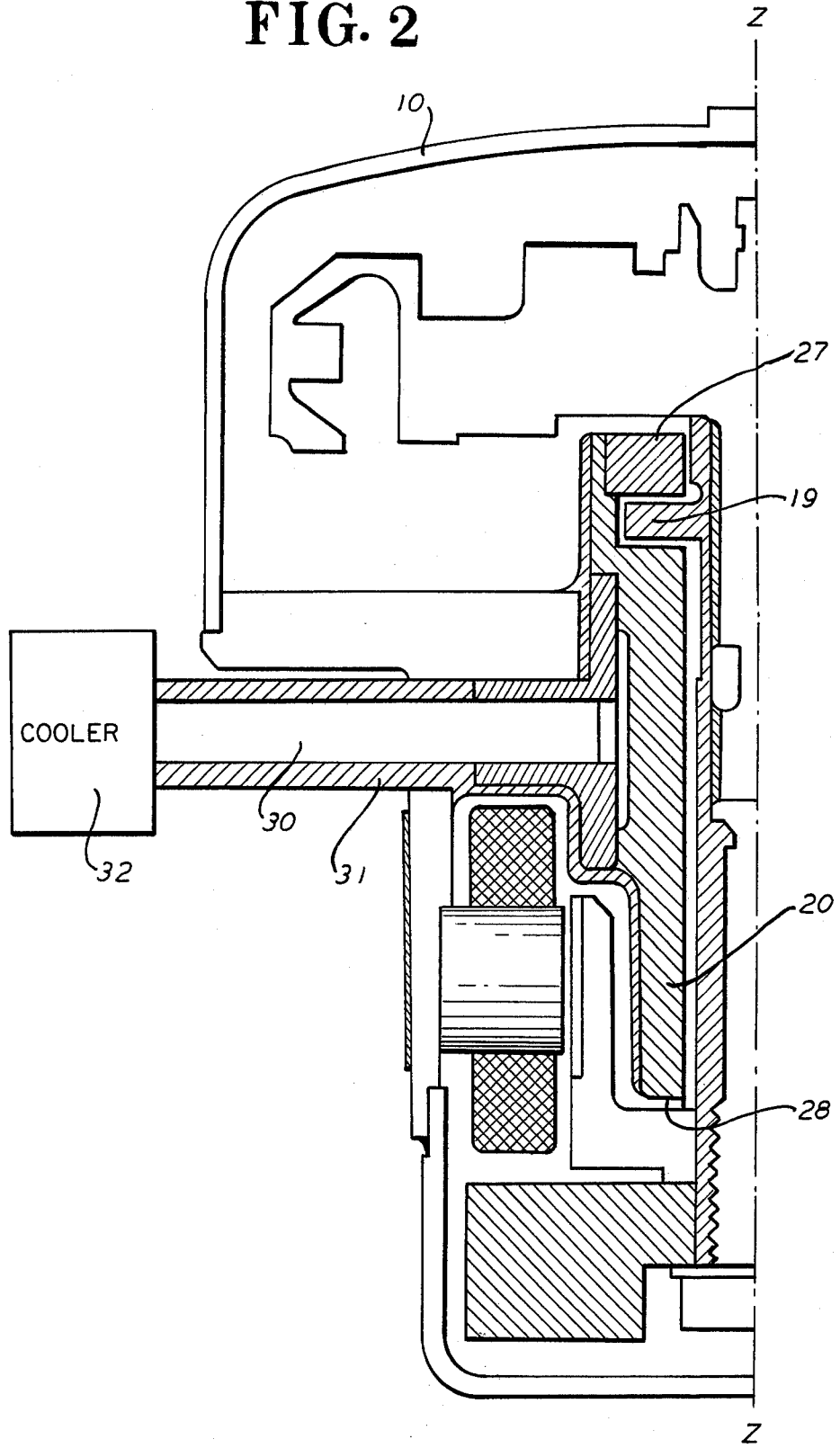

These and other objects and advantages will be more readily understood by those skilled in the art after a detailed consideration of the following specification taken in conjunction with the accompanying drawing wherein:

FIG. 1 shows a flexure-supported gyro in partial section incorporating the liquid bearing system of the invention; and FIG. 2 is a view similar to FIG. 1 showing a heat pump for removal of heat from the bearing surface.

Referring now to FIG. 1, there is shown in partial section one-half of a flexure-supported gyro in which the liquid bearing system of the invention is incorporated. The section omitted would be the mirror image of the section shown. The gyroscope is housed in a hermetically sealed casing or housing 10. Casing 10 comprises an upper portion 10a which houses the flexure-supported rotor 11 and thrust bearing 19. The lower case portion 10b houses the motor-stator 14, the rotor shaft 13, counter weight 17, and the journal bearing 18. Upper case 10a is joined to lower case 10b and 10c by welding or soldering. The lower case 10b has circular flange portion 15 with an opening 15a through which the shaft enters the upper case portion 10a. The flexure-supported rotor 11 is attached by adhesive between 12 and shaft 13. Shaft 13 is driven about the longitudinal axis Z—Z by motor-stator 14. Motor-stator 29 is attached to shaft 13. Counter weight 17 is attached to the end of shaft 13 in order to evenly distribute the bearing load. The bearing is functionally divided into a journal bearing 18 and thrust bearing 19.

The outer sleeve 20 of the bearing is attached to holder 21 by, for example, adhesive bonding. Peltier elements 22 are attached to holder 21 and flange 15 in such a manner that the elements, although mutually connected in series, are insulated from 21 and 15. This may be accomplished by successive coating of the surfaces first, with an insulating material such as alumina followed by a metal coating such as nickel. The Peltier elements are then soldered into position and electrically connected to an outside generator by means of a hermetically tight feedthrough (not shown). This current generator is adjusted to either output current to cause constant power to be dissipated in the Peltier elements or to output current such that a constant temperature drop is realized across the Peltier elements. The design of such current-source is well known to those skilled in the art. Peltier elements 22 are covered with a thermally insulating coating 24 which consists of a polymer mixed with glass-microballons and which prevents vapor condensation.

Because no seals are required, the gyroscope can be simply filled with a low viscosity lubricant. Specifically, at the time of manufacture, the gyroscope is internally evacuated and filled with approximately 200 mg low viscosity lubricant such as n-heptane or a fluorocarbon. Within the gyroscope casing, the lubricant remains partly liquid. The vapor from the lubricant fills the voids inside of the gyroscope.

The principle of operation of the liquid bearing of the present invention is based upon the fact that the vapor of a low viscosity fluid can condense easily upon a cool surface. By cooling the bearing itself, the liquid can be transported into and retained in the bearing.

In order to start-up, the liquid bearing current is simultaneously applied to the heater 26 and to Peltier elements 22. Commercially available Peltier elements have a heat pumping capacity of six watts for the size indicated in FIG. 1. Unavoidable heat losses will reduce the applied cooling power at the bearing to approximately two watts. After a short time, the lubricant will condense on surfaces 27 and 28. Surfaces 27 and 28 are not coated with the insulator 24. The cooled lubricant wets surfaces 27 and 28 and forms a film thereon. Capillary action will suck the liquid into the bearing surfaces about 18 and 19. Two watts cooling power will give rise to a condensation rate of 6 mg/sec for n-heptane. The amount needed in the bearing can be filled in a relatively short span of time. The motor 14–29 can now be started. Usually, the shaft 13 and thrust-plate 19 is machined with shallow grooves. The purpose of these pump-grooves is to increase the hydrodynamically produced pressure in the lubricant and to increase the bearing's dynamic and static stability. These pump-grooves can be oriented in such a manner that they aid the capillary pumping action described above. The increased pressure inside the bearing when the gyroscope is started assures that the lubricant will remain liquid and that the bearing will be filled to capacity very quickly. The amount of lubricant filled in the instrument at the time of manufacture shall be so proportioned that no liquid mass of the lubricant remains in the gyro after start except the liquid in the bearing and the condensate film on surfaces 27 and 28. This has significant advantages: the vapor in the gyroscope will become starved. The pressure in the gyroscope is then reduced to the vapor-pressure of the cooled liquid film on surfaces 27 and 28. This will in turn reduce the pressure-induced damping and improve gyroscope performance. The starved vapor in the gyroscope also reduces the heat-transfer. This will conserve power during operation of the instrument. After the start-up is accomplished, the current to the Peltier elements can be lowered to a fraction of what is required during start-up. This sustaining Peltier current can be calculated or measured. The sustaining current necessary to maintain a full bearing can easily be determined by measurement of the bearing dynamic stiffness. A partly full bearing of this type runs well but exhibits less stiffness than a completely filled bearing.

Peltier elements operating as heat pumps in the temperature range of −100° C to +100° C are commercially available. These elements have no known failure mechanism and no moving parts. It can, therefore, be expected that the described bearing system has a very long life. Good compatibility between gyroscope components such as epoxies, wire insulation, etc., can be achieved by careful choice of lubricant.

The heat transfer inside the gyro at start-up is increased by several orders of magnitude compared to a partly evacuated gyroscope. This is due to the fact that heat transfer is accomplished by evaporation and condensation. This factor allows the instrument to heat up to a steady state temperature very quickly. Performance improvements can therefore be expected not only during start but also after sustained operation.

Evacuation and filling of the instrument is quite simple. The quantity of lubricant used is not critical. Minor changes, due to internal absorption for instance, will not affect performance.

The temperature limits for the described system are quite wide. It is an advantage that the described system can start at −55° C. High temperature exposure during storage will not render the system inoperative.

A further advantage of the present invention is that in military application no heavy metals have to be used in the system which makes the bearing system insensitive to radiation and the system is unaffected by seal wear or dynamic instability of the seal. Some seals use magnetic liquids to enclose the lubricant. The advantage of this invention over such bearing seal systems is that no magnet fields have to be utilized to contain the lubricant.

It is contemplated by the invention that the principle of transport and confinement of bearing liquid could be utilized in other types of gyroscopes other than the type described. Further, as best seen in FIG. 2, heat can be conveniently pumped by means of a heat pipe 30. Heat pipe 30 as shown has insulation 31 and cooler 32. Design freedom is achieved when a heat pipe is utilized. The operation of the heat pipe is well known in the art and in this application it can be located at some distance from the gyro.

While a particular embodiment of the liquid bearing of the invention has been shown and described, modifications may be made. It is intended to cover all such modifications which fall within the spirit and scope of the invention in the following claims.

What is claimed is:

1. A fluid bearing device comprising:
   a housing,
   a heater surrounding said housing,
   a rotatable member encased within said housing and protruding through an opening in an inner wall of said housing, said rotatable member having a elongated cylindrically shaped journal member having a disc-shaped thrust plate member mounted at one end of said journal member, a sleeve member mounted in said housing for supporting said rotatable member,
   a film of fluid interposed between the rotatable member and the inner surface of said sleeve,
   a motor for rotating said rotatable member,
   a plurality of Peltier elements mounted within said housing for conducting heat away from the surfaces of said rotatable means and sleeve as said film is circulated by capillary action by grooves machined into said thrust plate and shaft, said motor rotating said thrust plate and shaft, and
   means for electrically connecting said Peltier elements to an external current source whereby heat may be removed from the journal surfaces of said bearing device.

2. The fluid bearing device of claim 1 comprising:
   a holder mounted in said housing for supporting said Peltier elements such that said Peltier elements are mutually connected in series but insulated from said journal surfaces of said sleeve and said rotatable member, and
   a fluid film consisting of a lubricant of n-heptane said film within said housing being so proportioned that no liquid mass of fluid remains after gyro start-up except the fluid in said bearing surfaces and a condensate film formed on predetermined areas of said rotatable member whereby the vapor in the housing is starved and the pressure in the housing is then reduced to the vapor pressure of the cooled liquid film on the predetermined surfaces of said rotatable member.

3. The fluid bearing device of claim 1 comprising:
a fluid film consisting of a lubricant of a fluorocarbon whereby when a current is supplied to said heater and said Peltier elements said fluid will condense on predetermined surfaces of said rotatable member said lubricant wetting said surfaces and forming a film thereon said capillary action sucking said liquid into said bearing and cooling it and subsequently the heat in said bearing being removed by said Peltier elements.

4. The fluid bearing device of claim 1 comprising:
a heat pump mounted within said housing for conducting heat away from the bearing surfaces.

5. A seal free fluid bearing device comprising:
means for enclosing said device,
means within said enclosing means for rotation therein,
means within said enclosing means for supporting said rotation means,
means interposed between the inner surface of said supporting means and said rotation means for reducing friction therebetween, and
means within said enclosing means for conducting heat from said friction reducing means.

6. The fluid bearing device of claim 5 comprising:
means cooperating with said rotation means for circulating by capillary action said friction reducing means between said inner surface of said supporting means and said rotation means.

7. The fluid bearing device of claim 6 comprising:
means for thermally insulating said heat conducting means.

8. The fluid bearing device of claim 7 comprising:
means for mounting said supporting means on said enclosing means.

9. The fluid bearing device of claim 8 comprising:
means for supporting said heat conducting means.

10. A fluid bearing device comprising:
a housing,
a rotatable member mounted within said housing,
a sleeve member supporting said rotatable member in said housing,
a film of fluid interposed between the inner surface of said sleeve member and said rotatable member, and
a plurality of Peltier elements mounted within said housing for conducting heat away from said sleeve member and said rotatable member.

11. The fluid bearing device of claim 10 comprising:
a rotatable member having a shaft and a thrust plate said shaft and thrust plate having a plurality of grooves machined thereon for increasing the hydrodynamically produced pressure in said fluid and for increasing the bearing's dynamic and static stability, said grooves also being oriented to aid in the circulation of said fluid by capillary action.

12. A fluid bearing device comprising:
a housing,
a rotatable member mounted within said housing,
a sleeve member supporting said rotatable member,
a film of fluid interposed between said rotatable member and the inner surface of said sleeve member, said rotatable member having a shaft and thrust plate having a plurality of grooves machined thereon for increasing the hydrodynamically produced pressure in said fluid and for increasing the bearing's dynamic and static stability said grooves also being oriented to aid in the circulation of said fluid by capillary action,
a plurality of Peltier elements mounted within said housing for conducting heat away from the surfaces of said rotatable member,
a coating of a layer of alumina and a layer of nickel applied to said Peltier elements for thermally isolating said Peltier elements from said fluid,
a holder attached to said sleeve member for supporting said Peltier elements so that said Peltier elements are mutually connected in series but insulated from said housing, and
means for electrically connecting said Peltier elements to an external current generator.

* * * * *